E. O. THOMASON.
VALVE.
APPLICATION FILED JUNE 19, 1913.

1,164,033.

Patented Dec. 14, 1915.

Witnesses.
E. R. Pollard
J. Urquhart.

Inventor.
Elmer O. Thomason.
by Cassell Severance
Atty.

UNITED STATES PATENT OFFICE.

ELMER O. THOMASON, OF LOS ANGELES, CALIFORNIA, ASSIGNOR TO KELLAR-THOMASON COMPANY, A CORPORATION OF CALIFORNIA.

VALVE.

1,164,033. Specification of Letters Patent. Patented Dec. 14, 1915.

Application filed June 19, 1913. Serial No. 774,612.

*To all whom it may concern:*

Be it known that I, ELMER O. THOMASON, a citizen of the United States, residing at Los Angeles, in the county of Los Angeles and State of California, have invented certain new and useful Improvements in Valves, of which the following is a specification.

This invention relates to improvements in valves and has particular relation to valves that are used in connection with irrigating systems, especially where means is required for controlling the flow of water from stand pipes or other outlets, as when it is desired to direct the water through surface piping, hose or the like.

It is an object of the invention to provide a valve mechanism which can be secured to the end of a cement or other outlet pipe and which is provided with a slide adapted to cut off water which would otherwise flow from said outlet, a mechanism also being adapted to receive the end of a pipe or elbow for directing the water to desired points.

It is also an object of the invention to provide a valve mechanism with a casing having upper and lower sections and an intermediate slide forming a valve, the mechanism also having means for forcing one member toward the other to make a water tight joint at the slide or valve.

With these and other objects in view, the invention consists in certain novel combinations, constructions and arrangements of parts as will be hereinafter fully described and claimed.

Figure 1:
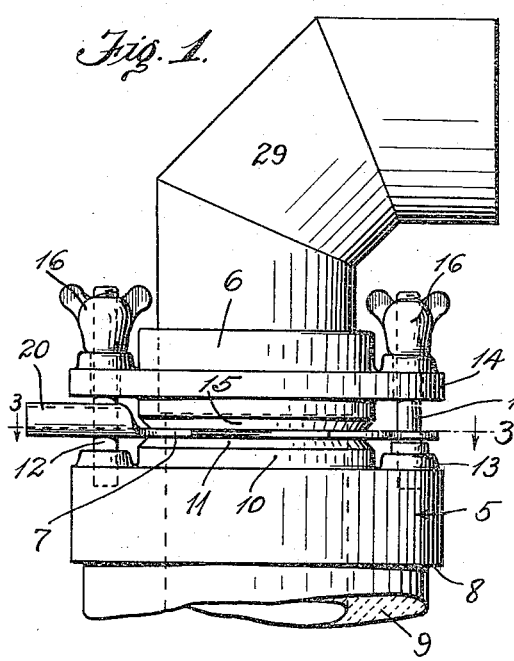
Figure 2:
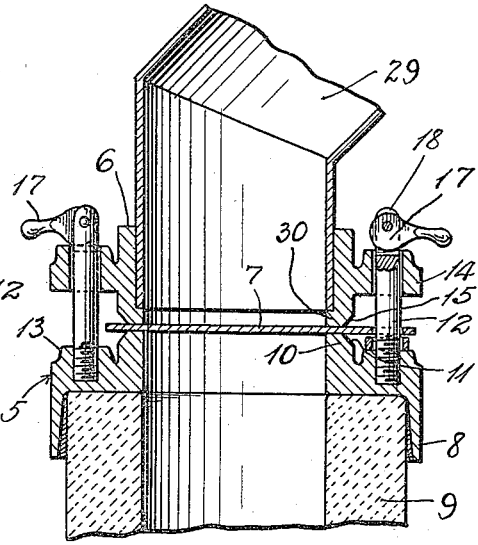
Figure 3:
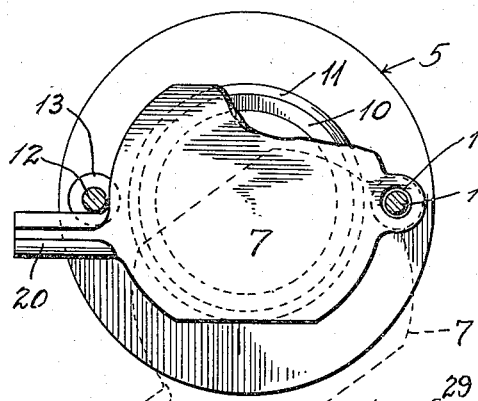
Figure 4:
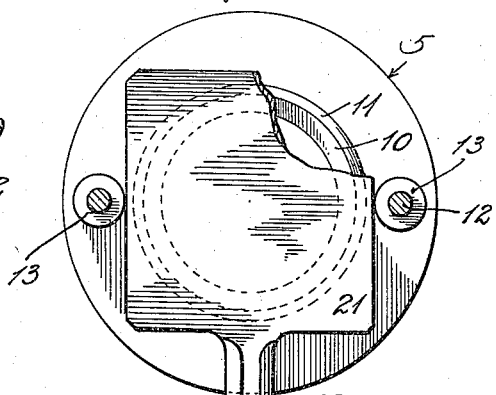
Figure 4:
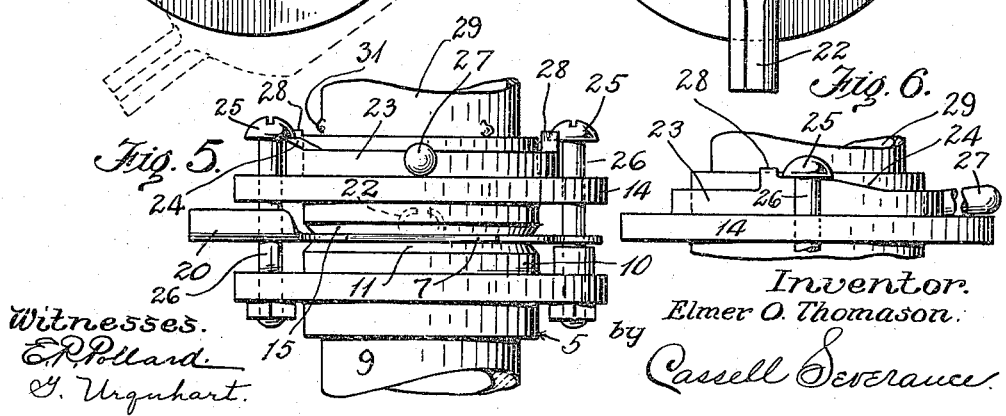

In the accompanying drawing forming a part of this specification: Figure 1 is a side elevation of a valve mechanism constructed in accordance with the present invention, a portion of a stand pipe being shown, and an elbow also being shown in position. Fig. 2 is a vertical sectional view through the mechanism, a modified form of clamping means being shown however. Fig. 3 is a transverse sectional view taken upon the lines 3—3 of Fig. 1. Fig. 4 is a similar transverse sectional view but showing a removable slide valve instead of a pivotal one. Fig. 5 is a side elevation of a valve mechanism having a cam ring for clamping the parts together. Fig. 6 is a side elevation of the upper member of the valve mechanism showing the cam ring from another view point.

The valve mechanism of the present invention is designed for use wherever the flow of liquids from one pipe into another is to be controlled but is especially well adapted for use in irrigating systems where vertical stand pipes project above the ground and where it is necessary to connect surface piping with the stand-pipe for directing water to any given points.

The details and features of the invention will now be more specifically described, reference being had to the drawing in which 5 indicates a lower valve member, 6 an upper valve member and 7 a valve proper. The lower member 5 is preferably in the form of a cap ring having a flange 8 adapted to fit over the end of stand-pipe 9. Such stand-pipes are usually of cement concrete and the cap ring or member 5 is usually secured upon the upper end of the said stand-pipe 9 by cementing it in place. The upper surface of the member 5 is provided with a vertically extending annular flange 10 surrounding the opening in said member. The flange 10 is preferably beveled at 11 upon its upper peripheral edge so as to facilitate the insertion of the valve between the said members 5 and 6. Projecting upwardly from said member 5 are standards or bolts 12 which are usually secured in thickened portions or bosses 13 upon the member 5.

The upper member 6 is provided with a pipe receiving body portion having a horizontal flange 14 projecting outwardly therefrom. The lower edge of the body portion is beveled at 15 to coöperate with the bevel 11 in facilitating the movement of the valve. The flange 14 is provided with openings through which the standards 12 project and a clamping means for holding member 5 against the valve is mounted upon the other upper ends. Such clamping means may be in the form of thumb-nuts 16 as shown in Fig. 1 and in such a case the upper ends of the standards 12 are screw-threaded. As shown in Fig. 2 cams 17 may be employed in the place of the thumb-nuts 16, the said cams being pivoted in bifurcations 18 formed in the upper ends of the said standards 12.

The valve 7 is usually made in the form of a flat plate of suitable metal and may be pivoted at 19 upon one of the standards 12. Opposite to pivotal point of said valve is a handle projection 20 by which the valve may be swung back and forth upon its pivot. The top portion of the valve is of sufficient size to cover and entirely close the opening in the member 5 and by swinging the valve outwardly as indicated in dotted lines in Fig. 3 the opening may be partially or entirely uncovered.

If preferred, the valve may be in the form of a flat plate 21 having a handle 22, the said plate being adapted to be thrust endwise between members 6 and 5 of the mechanism and to extend between the standards 12. As shown in Figs. 5 and 6 a somewhat different type of clamping-means may be used if desired, within the scope of the invention. Thus as shown in said Fig. 5 a loose ring 23 may be mounted upon the flange of the upper member 6 and be formed with one or more inclined portions 24 adapted to act as cams and engage the under sides of heads 25 formed upon upright bolts 26. These upright bolts take the place of standards 12 shown in Fig. 1 and the cam ring is provided with an operating handle 27 by which it may be controlled for forcing the cam portions 24 beneath the heads 25. The cam portions are also preferably provided with stops 28 for limiting the movements of the ring.

In operation the lower member or cap ring 5 is put in position upon a stand-pipe 9 and when it is not wished to take water therefrom the valve is closed and the clamping-means is set so as to force the upper member 6 tightly against the valve. This will prevent any leakage of water from the stand pipe. When it is desired to take water from the stand-pipe and direct it to various points over the ground or in a field, an elbow as 29 of suitable size is put in position in the opening of the upper member 6. Said elbow may rest upon a flange 30 as shown in Fig. 2 formed upon the inner surface of said member 6 or the elbow may be provided with projections as 31 which engage the upper edge of said member 6 as shown in Fig. 5, for preventing the elbow from resting upon the valve. The surface piping is connected with the elbow and extended in any desired direction. The valve is then pulled outwardly from between the members 5 and 6 and the water is permitted to flow into and through the elbow 29. The weight of the water in the elbow and adjacent piping is sufficient to hold the elbow in place and is usually sufficient to hold the member 6 against the member 5 but if there is any leakage between the members, the clamping-means may be adjusted to force the members tightly together. When ample water has been secured from said stand-pipe, the valve is forced between the members 5 and 6, the bevel edges 11 and 15 facilitating such movement and the water is thus cut off. The elbow and pipe may be then moved to another stand-pipe. The clamping-means may be always so adjusted as to prevent leakage at the valve.

It will be understood that the cap ring or lower member of the mechanism may be adapted to any kind of piping or stand-pipe without departing from the spirit of the invention, and that the device may be used with metallic or tile piping as well as cement concrete pipes. It will also be evident that various kinds of clamping-means and valve slides may be used within the spirit of the invention.

What is claimed is:

1. A valve connection mechanism comprising a pipe cap device, having separable cut off slide receiving members and adapted to receive auxiliary piping and a cut off slide adapted to force the said members apart and enter between them to close the pipe outlet, whether the auxiliary piping is engaging the said connection mechanism or not.

2. A pipe end controlling device having a member fastened to the pipe and a coöperating member removably held with respect thereto, guide means projecting from one member thereof and engaging and holding the other member and a valve plate adapted to force the members apart and enter between them for controlling the outlet of the pipe.

3. A pipe connection valve mechanism comprising a pipe ring fixed to a supply pipe, an auxiliary pipe holding ring resting thereon and adapted to hold an auxiliary pipe with respect to the supply pipe and a cut-off slide adapted to bear the weight of the auxiliary pipe holding ring and an auxiliary pipe therein, for sliding between the pipe rings to close the pipe outlet.

4. A pipe connection valve mechanism comprising a member adapted to be secured to the outlet of a pipe, guides projecting from said member, an auxiliary pipe holding member loosely engaging said guides, a valve slide adapted to move between said members and means for drawing said members together to grip said valve slide.

5. A pipe connection valve mechanism comprising a member having central openings and having a flange adapted to fit upon the end of a pipe, guiding studs projecting from said member outside the piping, an auxiliary pipe holding member loosely engaging said studs and having an internal recess adapted to receive the end of an auxiliary pipe and hold it in register with the opening in the other member and the outlet of the pipe and a valve slide pivotally engaging one of the exterior guiding studs and adapted to be swung to a position between the members of the device for controlling the flow of materials through the piping held in the register thereby.

6. A pipe connection valve mechanism comprising a member adapted to be secured to the outlet of a pipe, exterior guiding studs projecting therefrom, an auxiliary pipe holding member having apertures engaging said studs, the said members having engaging valve seat edges, a valve slide adapted to be introduced between said edges for controlling the passage of materials through the piping and means engaging the ends of said studs for clamping the said members upon said valve slide.

In testimony whereof, I have hereunto set my hand, in presence of two witnesses.

ELMER O. THOMASON.

Witnesses:
LILLIE VOLLMER,
CASSELL SEVERANCE.

Copies of this patent may be obtained for five cents each, by addressing the "Commissioner of Patents, Washington, D. C."